United States Patent
Yu

(10) Patent No.: US 10,762,654 B2
(45) Date of Patent: Sep. 1, 2020

(54) METHOD AND SYSTEM FOR THREE-DIMENSIONAL MODEL RECONSTRUCTION

(71) Applicant: SHANGHAITECH UNIVERSITY, Shanghai (CN)

(72) Inventor: Jingyi Yu, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 16/675,617

(22) Filed: Nov. 6, 2019

(65) Prior Publication Data

US 2020/0074658 A1    Mar. 5, 2020

Related U.S. Application Data

(63) Continuation of application No. PCT/CN2017/083750, filed on May 10, 2017.

(51) Int. Cl.
*G06T 7/557* (2017.01)
*G06T 17/00* (2006.01)
(Continued)

(52) U.S. Cl.
CPC ............ *G06T 7/557* (2017.01); *G06T 7/74* (2017.01); *G06T 15/20* (2013.01); *G06T 17/00* (2013.01);
(Continued)

(58) Field of Classification Search
None
See application file for complete search history.

(56) References Cited

U.S. PATENT DOCUMENTS

| | | | |
|---|---|---|---|
| 2007/0103460 A1 | 5/2007 | Zhang et al. | |
| 2010/0309292 A1 | 12/2010 | Ho et al. | |
| (Continued) | | | |

FOREIGN PATENT DOCUMENTS

| | | |
|---|---|---|
| CN | 103426170 A | 12/2013 |
| CN | 103763543 A | 4/2014 |

OTHER PUBLICATIONS

Jeon, H., Park, Ja., Choe, G., Park, Ji., Bok, Y., Tai, Y., Kweon, I., Accurate Depth Map Estimation from a Lenslet Light Field Camera, Jun. 2015, 2015 IEEE International Conference on Computer Vision and Pattern Recognition(CVPR), pp. 1547-1555. (Year: 2015).*
(Continued)

*Primary Examiner* — Said Broome
(74) *Attorney, Agent, or Firm* — Sheppard Mullin Richter & Hampton LLP

(57) ABSTRACT

A method of generating a three-dimensional model of an object is disclosed. The method may use a light field camera to capture a plurality of light field images at a plurality of viewpoints. The method may include capturing a first light field image at a first viewpoint; capturing a second light field image at the second viewpoint; estimating a rotation and a translation of a light field from the first viewpoint to the second viewpoint; obtaining a disparity map from each of the plurality of light field image; and computing a three-dimensional point cloud by optimizing the rotation and translation of the light field and the disparity map. The first light field image may include a first plurality of subaperture images and the second light field image may include a second plurality of subaperture images.

14 Claims, 4 Drawing Sheets

(51) Int. Cl.
*G06T 15/20* (2011.01)
*G06T 7/73* (2017.01)
(52) U.S. Cl.
CPC ............... *G06T 2200/08* (2013.01); *G06T 2207/10028* (2013.01); *G06T 2207/10052* (2013.01)

(56) References Cited

U.S. PATENT DOCUMENTS

2012/0177284 A1    7/2012  Wang
2016/0330376 A1*  11/2016  Debevec ............. H04N 13/204
2016/0353082 A1*  12/2016  Pitts ................... H04N 13/232

OTHER PUBLICATIONS

PCT International Search Report and the Written Opinion dated Jan. 26, 2018, issued in corresponding International Application No. PCT/CN2017/ 083750 (11 pages).

* cited by examiner

METHOD AND SYSTEM FOR THREE-DIMENSIONAL MODEL RECONSTRUCTION

CROSS-REFERENCE TO RELATED APPLICATION

This application is a continuation application of International Patent Application No. PCT/CN2017/083750, filed on May 10, 2017 and entitled "METHOD AND SYSTEM FOR THREE-DIMENSIONAL MODEL RECONSTRUCTION." The above-referenced application is incorporated herein by reference in its entirety.

TECHNICAL FIELD

The disclosure relates generally to a system for capturing and processing light field images, and more particularly, to a method and system for generating a three-dimensional model of an object by using light field images.

BACKGROUND

A light field (LF) camera, also known as a plenoptic camera, captures light travelling in every direction through a scene in four dimensions. That is, contrasted with a conventional camera, which records only light intensity, an LF camera captures both the intensities and the directions of the light rays. This enables sophisticated data processing even after the image data is captured. One can for example virtually change focus or perspective, or estimate depth maps from a single exposure.

By utilizing the rich information of LF images, and employing features of light fields (for example, regular sampling pattern, subpixel disparity, etc.), an LF camera can be used to generate a three-dimensional (3D) model of an object. For an accurate 3D model reconstruction, structure from motion (i.e., a method of solving LF poses) is an essential step. Traditional structure from motion methods often cannot achieve good results, since they often fail to use geometric constrains embedded in the light fields.

This disclosure presents a method of 3D model reconstruction which uses a new structure from motion method. The proposed structure from motion method exploits how ray geometry transforms under LF pose variations. This 3D model reconstruction method is more robust and more accurate, and can even work on topologically complex objects, such as flowers and so on. In addition, the 3D models generated by this method can be adopted in virtual reality (VR) devices and augmented reality (AR) devices, and can be viewed from any viewpoint.

SUMMARY

One aspect of the present disclosure is directed to a method of generating a three-dimensional model of an object is disclosed. The method may use a light field camera to capture a plurality of light field images at a plurality of viewpoints. The method may include capturing a first light field image at a first viewpoint; capturing a second light field image at the second viewpoint; estimating a rotation and a translation of a light field from the first viewpoint to the second viewpoint; obtaining a disparity map from each of the plurality of light field images; and computing a three-dimensional point cloud by optimizing the rotation and translation of the light field and the disparity map. The first light field image may include a first plurality of subaperture images and the second light field image may include a second plurality of subaperture images.

Another aspect of the present disclosure is directed to a system of generating a three-dimensional model of an object. The system may include a light field camera and a data processing unit. The camera may be configured to capture a plurality of light field images at a plurality of viewpoints. A first light field image may be captured at a first viewpoint, and a second light field image may be capture at a second viewpoint. The first light field image may include a first plurality of subaperture images, and the second light field image may include a second plurality of subaperture images. The data processing unit may be configured to estimate a rotation and a translation of a light field from the first viewpoint to the second viewpoint, obtain a disparity map from each of the plurality of light field images, and compute a three-dimensional point cloud by optimizing the rotation and translation of the light field and the disparity map.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several non-limiting embodiments and, together with the description, serve to explain the disclosed principles.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

In the specification, it is to be understood that terms such as "first" and "second" are used herein for purposes of description and are not intended to indicate or imply relative importance or significance or to imply the number of indicated technical features. Thus, the feature defined with "first" and "second" may include one or more of this feature.

In the description of the present disclosure, "a plurality of" means at least two, e.g. two, three and so on, unless specified otherwise.

In accordance with embodiments of the present disclosure, a 3D model reconstruction system including a data capturing unit and a data processing unit is provided. The data capturing unit captures LF images and transmits them to the data processing unit. The data processing unit performs camera calibration, structure from motion, stereo matching and depth fusion. Camera calibration is to correct view distortions in the LF images, structure from motion is to estimate LF poses, stereo matching is to obtain disparity maps of the LF images, and depth fusion is to optimize the LF poses and disparity maps to obtain a 3D point cloud. A 3D point cloud is a set of data points in a 3D coordinate system, and is used to represent the external surface of an object, i.e., a 3D model of an object.

1. System Overview

Figure 1:
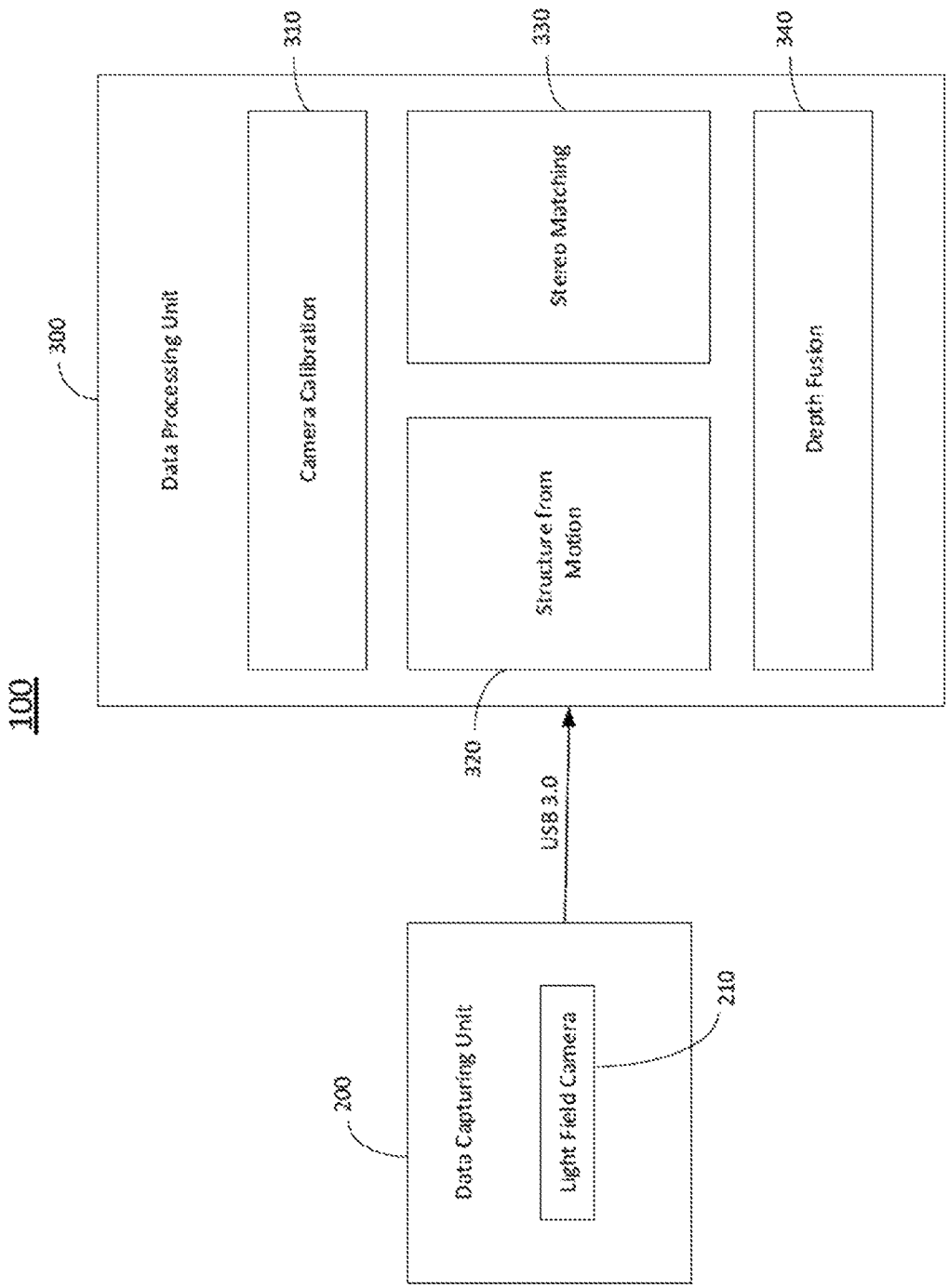
FIG. 1 is a schematic diagram for a 3D model reconstruction system, consistent with exemplary embodiments of the present disclosure.

FIG. 1 shows an exemplary 3D model reconstruction system 100 in accordance with an embodiment of the present disclosure. The system 100 may comprise a number of components, some of which may be optional. In some embodiments, the system 100 may include many more components than those shown in FIG. 1. However, it is not necessary that all of these components be shown in order to disclose an illustrative embodiment.

As shown in FIG. 1, the system 100 may include a data capturing unit 200 and a data processing unit 300. The data capturing unit 200 may include an LF camera 210. The data processing unit 300 may include a camera calibration unit 310, a structure from motion unit 320, a stereo matching unit 330, and a depth fusion unit 340.

2. Data Capturing Unit 2.1 Light Field Camera

In some embodiments, the data capturing unit 200 includes an LF camera 210, which includes an array of micro-lenses placed in front of an otherwise conventional image sensor, so that it can sense intensity, color and directional information. Images captured by an LF camera may be called as LF images, which include intensity, color and directional information, and are useful for a 3D model reconstruction.

In some embodiments, a Lytro Illum LF camera may be used as the LF camera 210. A Lytro Illum LF camera can capture a 15×15 LF image in one exposure, i.e., each LF image includes 15×15 subaperture images. The parameters of the LF camera 210 are listed in Table 1.

TABLE 1

| Sensor | Light field sensor based on CMOS technology |
| --- | --- |
| Sensor Format | 1/1.2 |
| Active Area | 10.82 * 7.52 mm |
| LF Resolution | 40 Megaray |
| Processor | Snapdragon ® 800 processor |
| USB protocol | Micro USB3.0 |
| Zoom | 8x optical |
| Shutter | Focal Plane Shutter |
| Lens Aperture | Constant f/2.0 |
| Focal Length | 9.5-77.8 mm |
| Macro | Focus to 0 mm from lens front |

2.2 Data Capturing Method

The LF camera 210 may be used as a virtual scanner, moving around an object of interest at a plurality of viewpoints, and taking LF images at each viewpoint with one exposure. Any two successive LF image data taken at two adjacent viewpoints may share no less than 50% of overlapping field of view. To achieve a final full 3D model reconstruction, the plurality of viewpoints cover all viewpoints of the object. The LF image data captured by the LF camera 210 may be transmitted to the data processing unit 300 via, for example, USB 3.0.

3. Data Processing Unit

As shown in FIG. 1, the data processing unit 300 includes a camera calibration unit 310, a structure from motion unit 320, a stereo matching unit 330, and a depth fusion unit 340.

3.1. Camera Calibration

At the camera calibration unit 310, the captured LF images are calibrated. To construct a 3D model by an LF camera, both the intrinsic and extrinsic parameters of the LF camera need to be obtained. The intrinsic parameters refer to the parameters to link pixel coordinates of an image point with the corresponding coordinates in a camera reference. The extrinsic parameters may define a location and orientation of the camera reference frame with respect to a known world reference frame. In some embodiments, a method of geometric calibration of micro-lens-based LF cameras from Yunsu Bok (Yunsu Bok, et al, "Geometric Calibration of Micro-Lens-Based Light Field Cameras Using Line Features," *IEEE Trans. Pattern Anal. Mach. Intell.*, vol. 39, no. 2, pp. 287-300, 2017) may be applied to calibrate the intrinsic and extrinsic parameters of each subaperture image in the LF images. After the calibration, 15×15 calibrated subaperture images can be obtained for the LF image at each viewpoint. The resolution of the subaperture images captured by the above-discussed Lytro Illum LF camera is 552×383. In some embodiments, among the 15×15 subaperture images at each viewpoint, the central 7×7 subaperture images are selected for further data processing.

3.2 Structure from Motion

The calibrated LF images are transmitted to the structure from motion unit 320 to obtain LF poses, i.e., the rotation and translation of the LF images from one viewpoint to another. The traditional structure from motion method does not achieve good results with LF images, since it fails to use the rich geometric constrains embedded in the LF images. In this disclosure, we propose a robust and accurate LF structure from motion method, which exploits how ray geometry transforms under LF pose variations.

The LF pose estimation method can be described in ray space. To represent a light field, two plane parameterization (2PP) is adopted for its simplicity. In 2PP, each ray is parameterized by its intersections with two parallel planes $\Pi_{uv}$ and $\Pi_{st}$. Assuming $\Pi_{uv}$ is the camera plane at z=0 and $\Pi_{st}$ is the image plane at z=1, each ray can be represented as the components of its intersections with $\Pi_{st}$ and $\Pi_{uv}$. To further simplify the derivation, by defining $\alpha=s-u$ and $\tau=t-v$ to parameterize the ray direction as $[\sigma, \tau, 1]$, all rays can be parameterized as a 4-tuple $[\sigma, \tau, u, v]$.

For example, a first light field, F, is captured by the LF camera at a first viewpoint k, and a second light field, F', is captured by the LF camera at a second viewpoint k+1, and F' is aligned to the world coordinates. Given a ray $r=[\sigma, \tau, u, v]$ within F, if the transformation between F and F' is known, r can be transformed to F' as $r^*=[\sigma^*, \tau^*, u^*, v^*]$ using R, T:

$$w \begin{bmatrix} \sigma^* \\ \tau^* \\ 1 \end{bmatrix} = R \begin{bmatrix} \sigma \\ \tau \\ 1 \end{bmatrix}, \quad (1)$$

-continued $$\begin{bmatrix} \mu^* \\ v^* \\ 0 \end{bmatrix} = R \begin{bmatrix} u \\ v \\ 0 \end{bmatrix} + T - q \begin{bmatrix} \sigma^* \\ \tau^* \\ 1 \end{bmatrix}$$

where w, q are two scale factors, R is a 3×3 rotation matrix and T is a 3×1 translation vector. Equation (1) is the ray transformation under light fields. The next step of the LF pose estimation method is to solve R and T.

Figure 2:
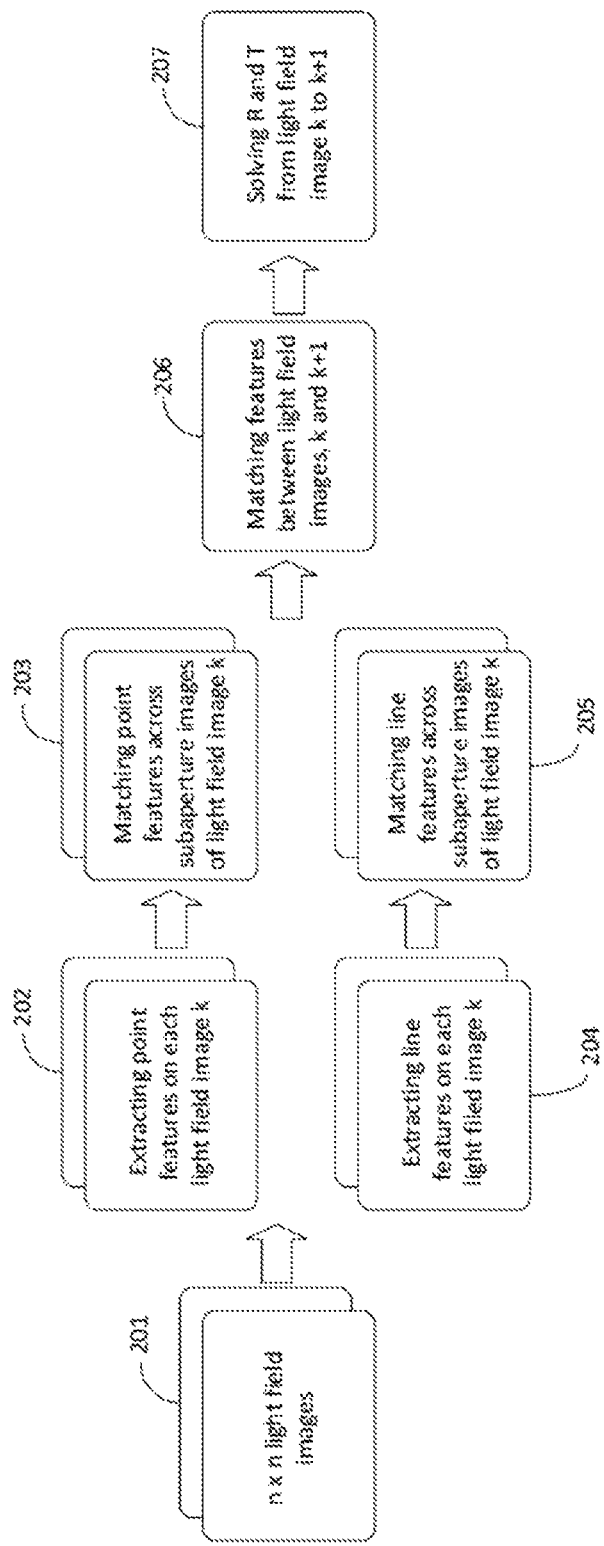
FIG. 2 is a flow diagram illustrating a method of estimating an LF pose from a first viewpoint to a second viewpoint, consistent with exemplary embodiments of the present disclosure.

Generally speaking, by extracting point and line features of each LF image, conducting feature matching across the subaperture images to find matched features, and matching these matched features between two different LF images, the LF poses can be estimated based on the matched features. FIG. 2. is an exemplary flow diagram illustrating the method of estimating an LF pose from a first viewpoint to a second viewpoint, in accordance with an embodiment of the present disclosure.

As shown in FIG. 2, at step 201, a plurality of LF images are input into the structure from motion unit 320. Each of the plurality of LF images is taken at a different viewpoint, and includes 7×7 subaperture images.

At step 202, point features on each LF image are extracted. At step 203, point features of each LF image are matched across the corresponding subaperture images to get matched point features of each LF image. If only the point features are considered, at step 206, the matched features of one LF image are matched to the matched features of another LF image to obtain the matched features between the two LF images. These obtained matched features between the two LF images can be used to estimate R and T between the two light fields at step 207.

Take one LF image, LF image k captured at viewpoint k, as an example. At step 202, x number of first point features are extracted for LF image k. At step 203, these first point features are matched across the 7×7 subaperture images of LF image k, and y number of first matched point features are found for LF image k. In other words, for LF image k, it has 7×7 subaperture images. The x number of first point features are matched between a first subaperture image to a second subaperture image, then matched to a third subaperture image, and so on. This process continues among the 7×7 subaperture images of LF image k, and results in y number of first matched point features of image k. Similarly, for another LF image k+1, captured at viewpoint k+1, x' number of second point features may be extracted, and y' number of second matched point features may be found for LF image k+1. At step 206, considering only point features, the y number of first match point features are matched to the y' number of second matched point features, and m number of matched point features are found to be matched between LF image k and LF image k+1. Then at step 207, the rotation R and translation T of the light field from viewpoint k to k+1 can be estimated based on these m number of matched point features. The detailed method can be explained in 2PP as presented in the following discussion.

Consider any two rays $r_0=[\sigma_0, \tau_0, u_0, v_0]$ and $r^*=[\sigma^*, \tau^*, u^*, v^*]$ within same light field F' passing through a same 3D point, the rays should satisfy the side operator:

$$(\sigma_0-\sigma^*)(v_0-v^*)=(\tau_0-\tau^*)(u_0-u^*) \quad (2)$$

where $\sigma^*, \tau^*, u^*, v^*$ is a function in R, T. So by combining Equation (1) and Equation (2), an energy function with point features to solve R, T can be developed as:

$$E_P=\Sigma_{i,j}\|(\sigma^*_i-\sigma_j)(v^*_i-v_j)-(\tau^*_i-\tau_j)(u^*_i-u_j)\| \quad (3)$$

where $[\sigma_i, \tau_i, u_i, v_i]$ and $[\sigma_j, \tau_j, u_j, v_j]$ are correspondent rays passing the same 3D points in F and F', $[\sigma^*_i, \tau^*_i, u^*_i, v^*_i]$ is the transformed ray from F to F'. To find the optimal R, T, the gradient based optimization method can be used to solve Equation (3), and random sample consensus (RANSAC) method is used to remove outliers.

Line features can also be employed to estimate the rays correspondence between different light fields. By leveraging the line feature matching across light fields to compute R and T, the LF pose estimation method becomes more robust.

Considering the line features, at step 204, line features on each LF image are extracted by the line segment detection (LSD) algorithm in each of the corresponding subaperture images. The regular sampling property of the light field teaches that baselines between any two adjacent cameras or subapertures are always the same. The baseline is the distance between adjacent cameras or subapertures in pixel, measured in unit of mm. By utilizing this property, at step 205, line features of each LF image are matched across the corresponding subaperture images to get matched line features of each LF image. Accordingly, at step 206, both matched point and line features of one LF image are combined and matched to the matched point and line features of another LF image to obtain the matched features between the two LF images. These obtained matched features between the two LF images then can be used to estimate R and T between the two at step 207.

Again take one LF image, LF image k captured at viewpoint k, as an example. At step 202, x number of first point features are extracted for LF image k. At step 203, these first point features are matched across the 7×7 subaperture images of LF image k, and y number of first matched point features are found for LF image k.

In the meanwhile, at step 204, p number of first line features are extracted for LF image k. At step 205, these first line features are matched across the 7×7 subaperture images of LF image k, and q number of first matched line features are found for LF image k. In other words, for LF image k, it has 7×7 subaperture images. Considering only line features, the p number of first line features are matched between a first subaperture image to a second subaperture image, then matched to a third subaperture image, and so on. This process continues among the 7×7 subaperture images of LF image k, and results in q number of first matched line features of image k. Similarly, for another LF image k+1 captured at viewpoint k+1, x' number of second point features may be extracted, y' number of second matched point features may be found for LF image k+1, p' number of second line features may be extracted, and q' number of second matched line features may be found for LF image k+1.

At step 206, the matched point and line features are combined. The y+q first matched features of LF image k are matched to the y'+q' second matched features of LF image k+1, and n number of matched features are found to be matched between the LF image k and LF image k+1. The n number of matched features may include both point and line features.

In some embodiments, only line features may be used at step 206, i.e. the q number first matched line features of LF image k are matched to the q' second matched line features of LF image k+1 to obtain the matched line features between the LF image k and LF image k+1.

Then at step 207, the rotation R and translation T of the light field from viewpoint k to k+1 can be estimated based on these n number of matched features. The detailed method can be explained in 2PP as presented in the following discussion.

To represent the above discussed LF structure from motion method in 2PP, a 3D line l can be represented as $[\sigma_0, \tau_0, u_0, v_0]$. Suppose the 3D line l is not parallel to $\Pi_{st}$ and $\Pi_{uv}$. Any ray $[\sigma, \tau, u, v]$ passing though l should satisfy the bilinear constraint as the following:

$$\frac{\sigma - \sigma_0}{\tau - \tau_0} = \frac{u - u_0}{v - v_0}$$

One group of matched 2D lines corresponds to a line in the 3D space. If there are enough matched 2D lines in a group corresponding to a 3D line, the bilinear property can be used to recover the parameterization of the 3D line, such as $[\sigma_1, \tau_0, u_0, v_0]$. By using a line matching algorithm to match the lines in two different light fields, the matched 3D lines can be identified, i.e., two parameterizations in different light fields of the same line can be obtained.

For example, $[\sigma_0, \tau_0, u_0, v_0]$ in F and $[\sigma_1, \tau_1, u_1, v_1]$ in F' are two parameterizations of a 3D line. As shown in Equation (1), $[\sigma_0, \tau_0, u_0, v_0]$ can be transformed to $[\sigma^*_0, \tau^*_0, u^*_0, v^*_0]$ in F'. The following error function can be obtained for one pair of matched lines:

$$\text{error}=\|[\sigma^*_0,\tau^*_0,u^*_0,v^*_0]-[\sigma_1,\tau_1,u_1,v_1]\|$$

With all matched lines, the energy function for lines matching algorithm is:

$$E_L = \sum_{i,j} \|[\sigma_i^*, \tau_i^*, u_i^*, v_i^*] - [\sigma_j, \tau_j, u_j, v_j]\|$$

where $[\sigma_i, \tau_i, u_i, v_i]$ and $[\sigma_j, \tau_j, u_j, v_j]$ are parameterizations of a same 3D line in the light fields F and F' respectively, $[\sigma^*_i, \tau^*_i, u^*_i, v^*_i]$ is the transformed ray from F to F'. A final energy function can be obtained by combining $E_P$ and $E_L$:

$$E_{Final}=E_P+E_L$$

The final energy function combines points and lines features together, and by solving $E_{Final}$ using the gradient based optimization method, the LF poses (rotations and translations) can be estimated.

The LF structure from motion method proposed in this disclosure has the following advantages: 1. Robust. The RANSAC is used in the optimization step, which can efficiently remove outlier matches. 2. Accurate. The matched features between two light fields are enough to keep Equation (3) to find the optimal R and T. In addition, the method also utilizes the ray properties in light fields, which is very helpful and more efficient.

3.3 Stereo Matching

The calibrated LF images are also transmitted to the stereo matching unit 330 to obtain a disparity map of each LF image. Due to the special properties of the light field, for example, the regular sampling property, a disparity map can be generated from one single light field image. In this disclosure, we also propose a new stereo matching method for obtaining disparity maps of LF images. By assuming that the disparity can be represented as a linear combination of three color channels of an image, a stereo matching cost function can be solved to generate a disparity map. A cost function is a mathematical optimization method to obtain the optimal solution, i.e., no solution has a cost less than the cost of the optimal solution. Traditional constant assumption is only valid for fronto-parallel surfaces and is inaccurate for curved or slanted surfaces. This method is capable of modeling curved and slanted surfaces, and respects depth boundaries, thus, can generate more accurate disparity maps.

The disparity can be represented as a linear combination of three color channels of the image as following:

$$q_i = a_k I_i + b_k, \forall i \in \omega_k \quad (4)$$

where $(a_k, b_k)$ are some linear coefficients assumed to be constant in the sliding window $\omega_k$. A sliding window refers to a rectangular region of fixed width and height that "slides" across an image. So Equation (4) suggests a result that minimizes the energy function for disparity map:

$$J(q,a,b)=\Sigma_{k \in J}(\Sigma_{i \in \omega_k}(q_i - \Sigma_c a_k^c I_i^c - b_k)^2 + \epsilon \Sigma_c (a_k^c)^2) \quad (5)$$

where c indicates the color channel, and the second term on $a_k$ is for numerical stability and slightly favors constant disparity with a small weight $\epsilon$. Minimizing J(q, a, b) by eliminating $(a_k, b_k)$, Eq. (5) yields a pure regularization on q:

$$J(q) = q^T L q \quad (6)$$

where L is an N×N matrix, whose (i, j)-th element is $$\sum_{k | (i,j) \in \omega_k} \left( \delta_{ij} - \frac{1}{|\omega_k|} \left( 1 + (I_i - \mu_k) \left( \Sigma_k + \frac{\epsilon}{|\omega_k|} I_3 \right)^{-1} \right) (I_j - \mu_k) \right)$$

where $\Sigma_k$ is a 3×3 covariance matrix, $\mu_k$ is a 3×1 mean vector of the colors in window wk, and $I_k$ is the 3×3 identity matrix.

Equation (4) can be integrated into a global formulation for depth estimation from the light fields. Assuming $I_r$ is the center reference light field view and $I_o$ is the second sub-aperture image at a 2D position (o–r), the disparity map can by computed by minimizing the following energy function:

$$E(q) = \sum_o \sum_i (I_r(i) - I_o(i + q_i * (o - r)))^2 + \lambda q^T L q$$

where the first term corresponds to data fidelity and $\lambda$ is a balance weight. Since a baseline between views in the light fields is usually very small, $I_o$ can be expanded as $I_o(i+q_i \times (o-r)) \approx I_o(i) + \nabla_{(o-r)} I_o(i) q_i$, where $\nabla_{(o-r)} I_o(i)$ is the gradient along direction (o–r). Then above energy equation can be reduced as $E(q) = \Sigma_o \Sigma_i (I_r(i) - I_o(i) - \nabla_{(o-r)} I_o(i) q_i)^2 + \lambda q^T L q$, which only involves quadratic costs and can be efficiently solved. Accordingly a disparity map can be obtained.

In some embodiments, to improve the stereo matching method's efficiency and robustness, a multi-scale approach is utilized. It starts from coarse down-sampled inputs and recovers the corresponding disparity map of low resolution. Then, a linear interpolation to up-sample to higher resolution is employed and the disparity is estimated by using the disparity from low resolution as the initialization until the origin resolution is reached.

3.4 Depth Fusion

The estimated LF poses and the disparity map of each LF image at different viewpoints are input into the depth fusion unit 340, where a final optimization function is used to optimize the LF poses and the disparity map simultaneously. Once the LF poses and their corresponding disparity maps are optimized, these data can be processed together to generate an optimal 3D point cloud consistent in each light field, and the 3D model of the object is reconstructed.

Figure 3:
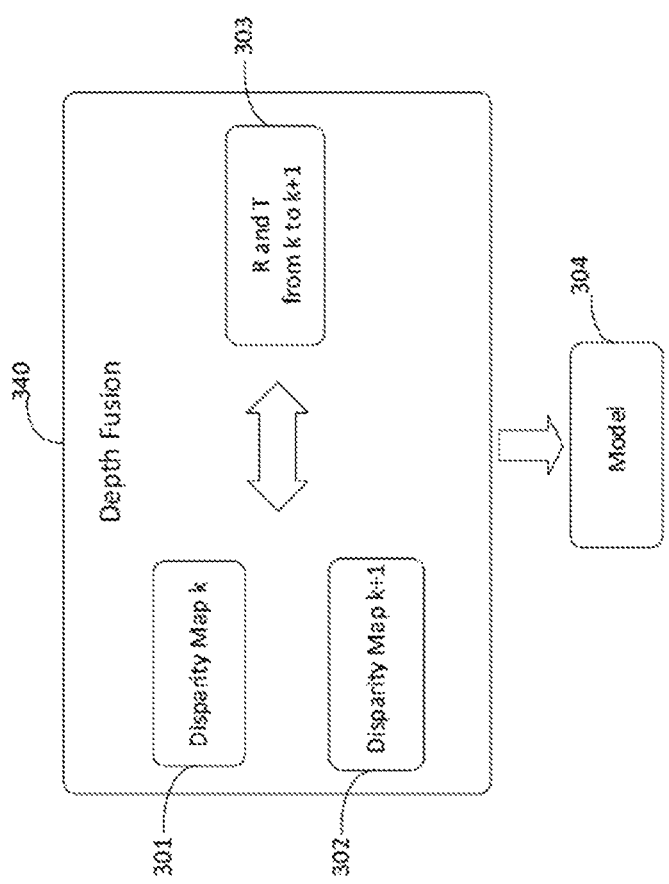
FIG. 3 is a flow diagram illustrating a method for computing a 3D point cloud by optimizing an LF pose and disparity maps, consistent with exemplary embodiments of the present disclosure.

FIG. 3 is an exemplary flow diagram illustrating the method of computing a 3D point cloud by optimizing an LF pose and disparity maps, in accordance with an embodiment of the present disclosure. Depth z can be computed from a disparity map, and the final optimization function is as following for each pair of r and r*:

$$\hat{R}, \hat{T}, \hat{z} \leftarrow \underset{R,T,z}{\operatorname{argmin}} \sum_{r,r^*} \left\| (s^* - s) - \frac{\hat{z}-1}{\hat{z}}(u^* - u) \right\|_2 +$$

$$\left\| (t^* - t) - \frac{\hat{z}-1}{\hat{z}}(v^* - v) \right\|_2 + \|\hat{z} - z\| + \|\hat{z} - z^*\|$$

As shown in FIG. 3, for each pair of LF image k taken at viewpoint k and LF image k+1 taken at viewpoint k+1, the depth fusion step optimizes their corresponding disparity maps k and k+1, and the rotation and translation between viewpoint k and viewpoint k+1. This depth fusion step can be optimized by gradient based optimization method. It can obtain more optimal LF poses and disparity maps and keep the final 3D point cloud be consistent in each light field. The final 3D point cloud covers all viewpoints of the object, and is the reconstructed 3D model of the object.

Figure 4:
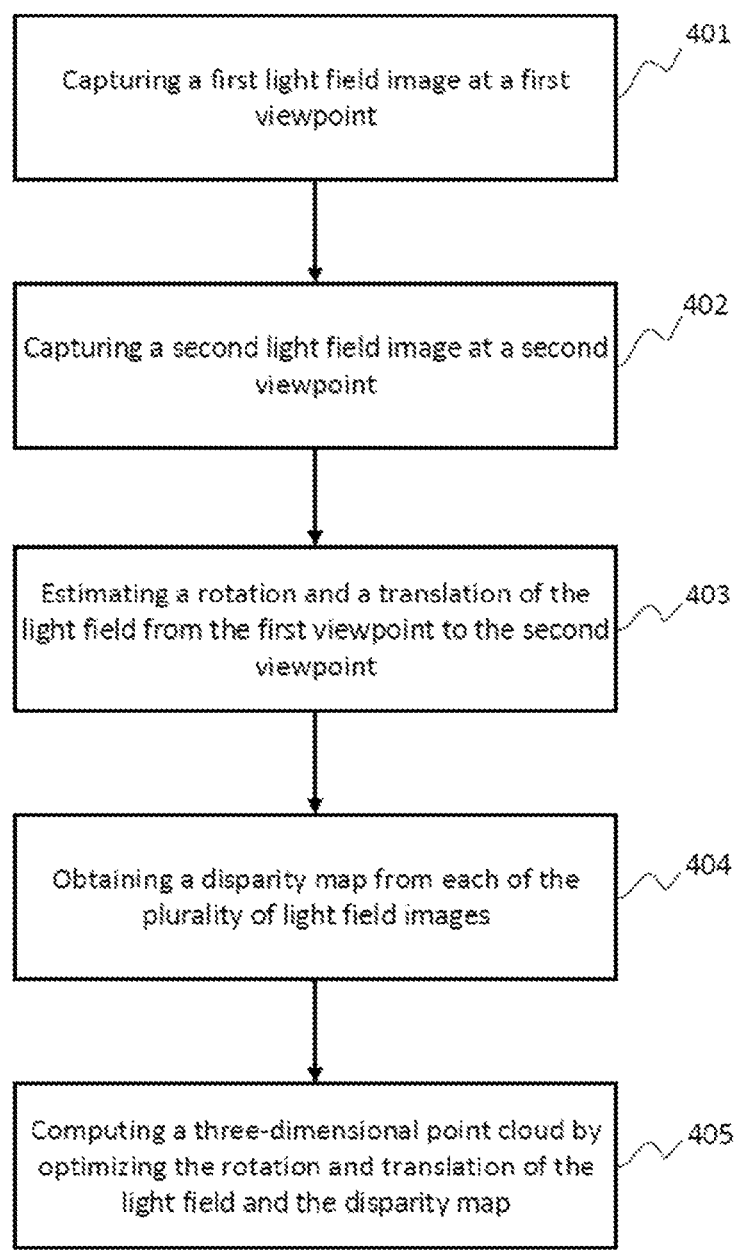
FIG. 4 is a flow diagram illustrating a method for generating a 3D model of an object by an LF camera, consistent with exemplary embodiments of the present disclosure.

FIG. 4 summarizes the method for generating a 3D model of an object by an LF camera in a flow diagram, consistent with exemplary embodiments of the present disclosure. At step 401, an LF camera captures a first LF image of an object at a first viewpoint. At step 402, the LF camera captures a second LF image of the object at the second viewpoint. At step 403, the captured LF images are transmitted to the data processing unit to estimate an LF pose from the first viewpoint to the second viewpoint. At step 404, disparity maps of the light fields can be obtained for the first LF image at the first viewpoint and the second LF image at the second viewpoint. At step 405, the estimated LF pose and the obtained disparity maps are optimized by a depth fusion step to compute a 3D point cloud. By repeating the step 401-404 at different viewpoints to cover all the viewpoints of the object, a complete 3D point cloud can be computed, and a 3D model of the object can be constructed by the LF camera.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method of generating a three-dimensional model of an object by a light field camera configured to capture a plurality of light field images at a plurality of viewpoints, the method comprising:
   capturing a first light field image at a first viewpoint, wherein the first light field image includes a first plurality of subaperture images;
   capturing a second light field image at a second viewpoint, wherein the second light field image includes a second plurality of subaperture images;
   estimating a rotation and a translation of a light field from the first viewpoint to the second viewpoint;
   obtaining a disparity map from each of the plurality of light field images; and
   computing a three-dimensional point cloud by optimizing the rotation and translation of the light field and the disparity map,
   wherein the plurality of viewpoints cover all viewpoints of the object.

2. A method of generating a three-dimensional model of an object by a light field camera configured to capture a plurality of light field images at a plurality of viewpoints, the method comprising:
   capturing a first light field image at a first viewpoint, wherein the first light field image includes a first plurality of subaperture images;
   capturing a second light field image at a second viewpoint, wherein the second light field image includes a second plurality of subaperture images;
   estimating a rotation and a translation of a light field from the first viewpoint to the second viewpoint;
   obtaining a disparity map from each of the plurality of light field images;
   computing a three-dimensional point cloud by optimizing the rotation and translation of the light field and the disparity map;
   identifying a plurality of first features on the first light field image and a plurality of second features on the second light field image;
   matching the first features across the first plurality of subaperture images to obtain first matched features, and matching the second features across the second plurality of subaperture images to obtain second matched features;
   matching the first matched features to the second matched features between the first light field image and the second light field image to obtain matched features between the light field at the first viewpoint and the second viewpoint; and estimating a rotation and a translation of the light field based on the matched features between the light field at the first viewpoint and the second viewpoint.

3. The method of claim 2, wherein the first features and the second features include line features.

4. The method of claim 2, wherein the first features and the second features include point features and line features.

5. The method of claim 1, wherein the disparity map is obtained by representing disparity as a linear combination of three color channels.

6. The method of claim 1, further comprising:
calibrating a plurality of subaperture images of each of the plurality of light field images.

7. The method of claim 1, wherein the first viewpoint and the second viewpoint include no less than 50% of overlapping field of view.

8. A system for generating a three-dimensional model of an object, comprising:
a light field camera configured to capture a plurality of light field images at a plurality of viewpoints; and
a data processing unit for generating the three-dimensional model,
wherein a first light field image which includes a first plurality of subaperture images, is captured at a first viewpoint, a second light field image which includes a second plurality of subaperture images, is captured at a second viewpoint, and the data processing unit is configured to estimate a rotation and a translation of a light field from the first viewpoint to the second viewpoint, obtain a disparity map from each of the plurality of light field images, and compute a three-dimensional point cloud by optimizing the rotation and translation of the light field and the disparity map,
and wherein the plurality of viewpoints cover all viewpoints of the object.

9. The system of claim 8, wherein the data processing unit is configured to:
identify a plurality of first features on the first light field image and a plurality of second features on the second light field image;
match the first features across the first plurality of subaperture images to obtain first matched features, and match the second features across the second plurality of subaperture images to obtain second matched features;
match the first matched features to the second matched features between the first light field image and the second light field image to obtain matched features between the light field at the first viewpoint and the second viewpoint; and
estimate a rotation and a translation of the light field based on the matched features between the light field at the first viewpoint and the second viewpoint.

10. The system of claim 9, wherein the first features and the second features include line features.

11. The system of claim 9, wherein the first features and the second features include point features and line features.

12. The system of claim 8, wherein the disparity map is obtained by representing disparity as a linear combination of three color channels.

13. The system of claim 8, wherein the data processing unit is configured to calibrate a plurality of subaperture images of each of the plurality of light field images.

14. The system of claim 8, wherein the first viewpoint and the second viewpoint include no less than 50% of overlapping field of view.

* * * * *